May 31, 1966 J. B. HEITMAN 3,254,143
METHOD FOR MOLDING CARBONIZED BODIES
Filed July 29, 1963
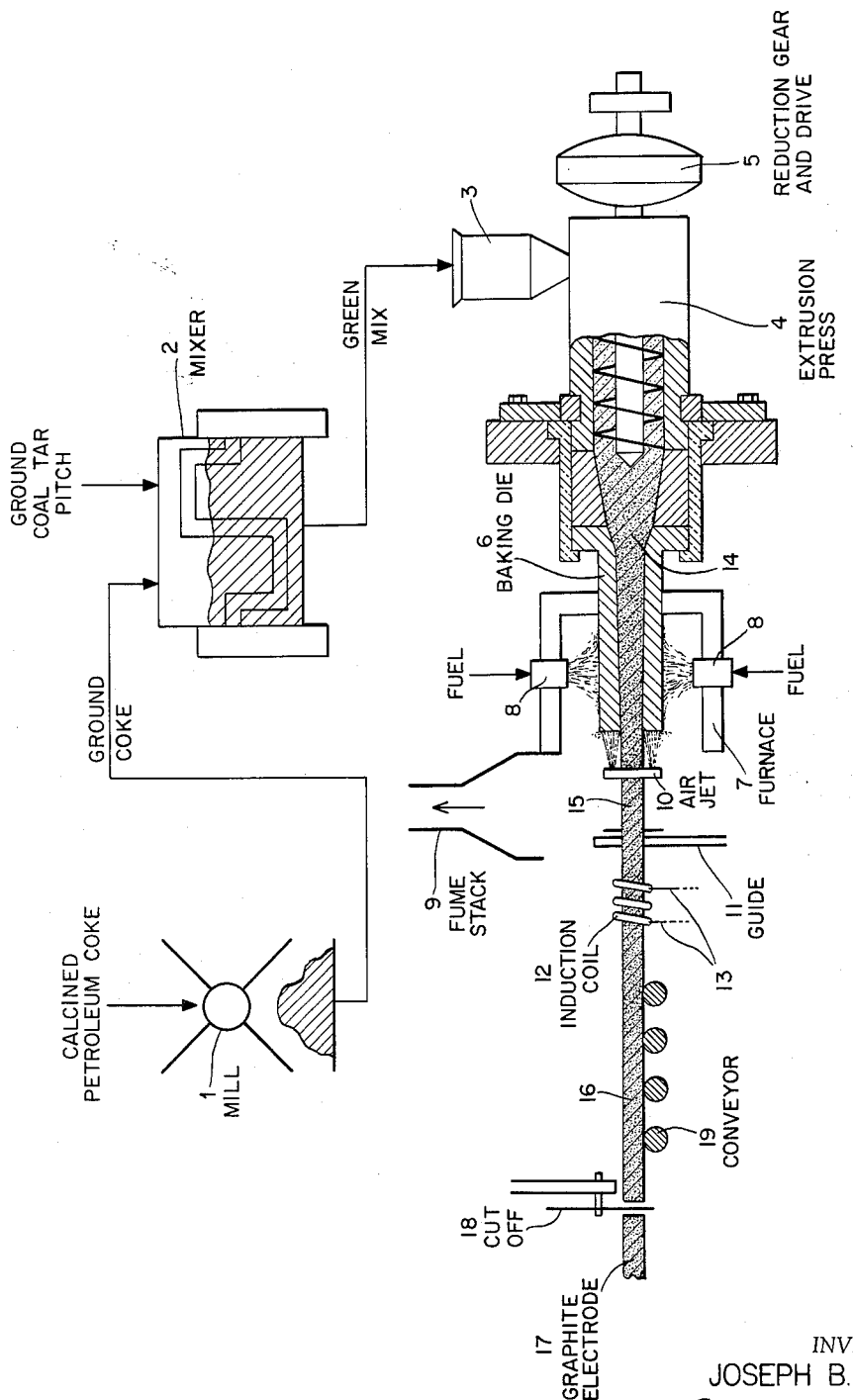
INVENTOR.
JOSEPH B. HEITMAN
BY *Emil W. Milan*
ATTORNEY

3,254,143
METHOD FOR MOLDING CARBONIZED BODIES
Joseph B. Heitman, Tacoma, Wash., assignor to Pennsalt Chemicals Corporation, Philadelphia, Pa., a corporation of Pennsylvania
Filed July 29, 1963, Ser. No. 298,481
10 Claims. (Cl. 264—29)

This invention relates to a method for producing in a relatively short period of time a continuous, extruded carbonized body in the form of baked carbon, graphite or carbide. In another aspect it relates to graphite, carbide, baked carbon, and carbonized bodies produced by the method of this invention.

Methods for producing shaped baked carbon bodies and shaped graphite bodies in a relatively short period of time, e.g., a matter of a few hours, are now known. See for example, Stoddard, U.S. 2,997,744, Method of Graphite Preparation, and Chemical Week, issue of Dec. 7, 1957, page 115, New Recipe for Fast-Baked Carbons. Carbides are manufactured in resistance furnaces requiring several days for a complete cycle from raw materials to carbide product.

The known rapid methods for baked carbon or graphite are limited to semi-continuously producing the product in the form of individual molded pieces whose sizes are limited by the size of the mold in which the product is formed, baked and/or graphitized.

I have now discovered a method whereby a carbonized body either of baked carbon, graphic, or carbide, depending on raw materials used, can be formed continuously with a desired cross-sectional pattern and of any desired length at a lineal rate of at least about 5 feet per hour. Although the description which follows is directed principally to baked carbon and graphite bodies and the method of their preparation, it is to be understood that the steps and apparatus described herein also can be used in the preparation of carbide and other carbonized bodies as hereinafter described.

In the practice of the invention, the term "carbonized body" defines a body formed from a mass containing a substantial amount of carbonaceous material which upon heating at carbonization temperatures is reduced substantially to carbon, e.g. baked carbon, or to a mass containing baked carbon, and at a temperature of about 1800° C. to graphite, or to a compound containing carbon chemically combined with a metal or nonmetal element, e.g., SiC or TiC.

The essence of my invention is that a carbonizable mixture comprising carbonaceous material and binder therefor is continuously carbonized while being extruded through an elongated die maintained at a temperature at least sufficient for carbonization to take place, e.g., above about 300° C., depending on the ingredients of the mixture, and preferably in the range of 700° C. to 1200° C., at a lineal rate controlled to ensure substantially the complete pyrolysis to carbon of the carbonaceous material entering the die before it reaches the outlet end of the die, meanwhile continuously pressurizing the mixture into the die, after an equilibrium operating condition has been established, at a pressure of at least 1200 p.s.i., and preferably in the range of 2000–4000 p.s.i. The product, in the form of an integral extruded carbonized, or baked, carbon body, continuously discharges from the outlet end of the die. The product is a rigid, dense rod, stick or slab conforming to the cross-sectional opening in the outlet end of the die. The product is in condition either for use as a baked carbon product, or as a baked carbon-containing body or for further treatment, such as graphitizing, or, in the case of a baked carbon-containing body also containing metal or nonmetal elements, or their oxides or salts, for conversion to a carbide.

To graphitize baked carbon product to a graphite form of carbon product, the baked carbon body, formed as above and as it leaves the extrusion-baking die, is fed directly and continuously into a graphitizing furnace. The interior of the graphitizing furnace is held at a graphitizing temperature such that the backed carbon is converted to graphite by the time the body of carbon reaches the outlet end of the furnace. Graphitizing as, a physical chemical reaction, is a function of temperature which begins at a temperature around 1800° C. and is substantially completed at 2100° C. or thereabouts, as is known in the art. Graphitization proceeds more rapidly at higher temperatures. Thus at about 2200° or more graphitization occurs in a period of seconds. Higher temperatures, i.e., above 2200° C. are preferred since there is a tendency at these temperatures for the graphite to form in larger crystals, resulting in a softer, more suitable graphite. By appropriate correlation of the rate of flow of the baked carbon from the extrusion die with the length and temperature of the graphitizing furnace, a graphite body having any desired length and any desired apparent density from about 1.4 to about 2.0 can be readily and continuously obtained by the method of my invention.

In addition to being continuous, my process has the added advantage of being fast by comparison to previous methods. For example, a square stick of baked carbon, or of graphite, measuring 2" x 2" in cross-section and having an apparent density of about 1.4 to 1.65 is produced continuously at rates of about two inches per minute.

In the practice of the invention, an extrusion apparatus having adjustable feed means and capable of operating at a discharge pressure in excess of 1200 p.s.i., preferably at from about 2000 to 10,000 p.s.i., is connected by flexible or rigid pressure-tight connecting means to the inlet end of an extrusion die of extended length. The extrusion apparatus is preferably a high pressure, screw type, extrusion machine of a kind readily available on the market. However, an extrusion press or ram type machine or any other type of pressing machine which can provide a substantially continuous feed of raw material in granular, plasticized or semi-fluid form to an extrusion die can be used. For practice of the invention, the extrusion apparatus is provided with means for heating the apparatus and its contents above the softening point of the binder, preferably to at least 150° C., so that the raw material mixture used in the practice of the invention can be fed in a substantially plastic flow state to the die. A steam jacket or electrical heaters can be used for this purpose.

The extrusion die must be of sufficient strength to withstand the pressure applied on the raw materials mixture fed to the die. It should be of such a design that it is thick enough to have sufficient mechanical strength and yet thin enough to permit a maximum of heat transfer. The die preferably should be corrosion resistant. At the temperatures involved in the practice of my invention, it is preferred to employ a die which is made of stainless steel, Inconel or other metal or alloy capable of retaining its mechanical strength at high temperatures. Many such materials or alloys are available on the market. Inconel is a tradename of the International Nickel Company. Wrought Inconel is preferred for the die. Its composition is 79.5% nickel, 13.0% chromium and 6.5% iron, with other elements in minor amounts.

The die must be at least long enough to ensure that the carbonaceous materials in the raw materials fed to the die are substantially completely reduced to carbon as they pass from one end of the die to the other. For a product of large cross-section, a longer die will be needed than for a product of a small cross-section. The length of the die necessary for successful practice of the invention therefore depends in part on the cross-sectional pattern of the die, which in turn governs the thickness of the body of the carbonized or baked carbon product. The minimum length should be that in which substantially complete baking of the raw material mixture under the pressure being applied by the feeder is attained. For example, a thin slab of baked carbon product can be prepared in a short time using a shorter die, whereas a large-diametered rod-shaped product will require a longer die, and a comparably long baking time. The correlation of length to thickness of product, to baking time, and to completeness of baking is a matter of engineering design which can be carried out easily by one skilled in the art.

Preferably, I employ a die in excess of about one foot or so in length. In the practice of one embodiment of the invention, the die used is an Inconel billet, 5 inches in diameter and 24 inches long with a 2″ x 2″ square hole bored straight along its long axis. A flange is screwed to the exterior of the inlet end of the die and is retained by appropriate means to a mating flange on the end of a screw type extrusion machine. The square hole of the die is appropriately tapered outwardly to a 3″ round diameter from a depth of about 2″ at the inlet end of the die to permit ease of feeding the raw material mixture to the die.

The die is heated by applying heat to the outside of the die body by direct or indirect means. Electrical strip heaters, induction heaters, direct flame, or hot gases of combustion from an oil, coal or gas flame, or other source of heat, can be used. The heat is applied along the die near the outlet end, so that the heat travels by conduction toward the inlet end of the die. In this manner, the area of the die nearest the outlet end of the die is kept hottest. The temperature should be at least high enough to insure carbonization of the binder and the other carbonaceous ingredients of any particular mixture used in the practice of the invention. When pitch is used as the binder, a temperature of at least 700° C. is preferably used.

The die is incased in a furnace capable of keeping a portion of, or all of, the die at a surface temperature of at least 700° C. or such temperature as many be required for carbonizing the product. Other embodiments of the die heating furnace can employ electrical heat to advantage for easy control. The die is preferably enclosed in a simple refractory furnace capable of retaining heat and of supporting the gas burners or electrical heaters which surround the heated portion of the die. The top of the furnace preferably extends as short distance past the end of the die and supports a hood and stack located over the discharge end of the die. A suitable fan is used to draw waste gases and fume into the hood. Preferably, the side of the furnace at the discharge end is made open to permit easy view and adjustment of the equipment during operation.

Carbonaceous material used in practicing the invention can be any carbonaceous material known in the art of making a baked carbon, graphite, carbide, or carbonized-binder-containing body. Examples of such carbonaceous material are coke, charcoal, carbon black, and materials forming any of the foregoing materials in situ, e.g., coal, lignite, wood and other vegetable fibers; hydrocarbons in solid form, including paraffins; synthetic resins containing carbon in the molecular structure, e.g., polybutadiene and polystyrene, or their copolymers; natural gums, e.g., rubber; natural resins, e.g., rosin, sugars, starches, aromatic compounds, e.g., naphthalenes, asphalt, and pitch.

Coke is the preferred carbonaceous material. The coke can be the residue derived from distillation by known methods of any coke-forming material, e.g., bituminous or anthracite coal, lignite or petroleum. The coke can be in calcined or uncalcined form. Petroleum coke in calcined form is especially preferred.

Carbonizable material used in practicing the invention is preferably prepared for use by grinding large-sized pieces so that all the material passes through a ⅛″ opening in a screen and not more than about 75% by weight of the material is retained on a 100 mesh Tyler standard sieve. For example, coke meeting these requirements is prepared by grinding coke which is larger in size than ⅛″ in diameter in a hammer mill using a ⅛″ screen. Other large-sized materials, e.g., charcoal and coal tar pitch, can similarly be reduced in size.

Although coke is preferably used as the carbonaceous material, it can be replaced in major or minor part or entirely by one or more of the other forms of carbonaceous materials described above. Thus, one can use a mixture of coke and charcoal; or of coke, charcoal and carbon black; or of charcoal and carbon black; or of coke and carbon black. The commercial granulated form of carbon black is preferably used in order to minimize dust problems in handling.

Graphite in the form of flour, flakes or granules also can be mixed with the carbonaceous material to modify the density of the product formed. Graphite flour is preferably used for this purpose.

In preparing the carbonaceous material for charge to the extrusion press, the material is mixed with a material which is known in the art as a binder, and which preferably also is carbonaceous. Examples of such a binder are pitch, e.g., coal tar pitch and petroleum pitch; synthetic resins, e.g., butadiene-styrene rubber; natural resins, e.g., rosin; and viscous liquids, e.g., molasses. Coal tar pitch is especially preferred as a binder material. The amount of binder used is from about 10 to 40 parts by weight per 100 parts of the carbonaceous material. When pitch is used as a binder, it is preferably ground in the same way and to about the same size as the coke is, e.g., using a hammer mill with about a ⅛″ screen.

Also in preparing the mixture, it is desirable to use a liquid, e.g., furfural or lubricating oil, to wet down the mixture in order to reduce dusting and to aid in compacting or granulating the mixture. However, use of lubricants or granulating agents is not critical to the practice of the invention.

Carbonizable mixtures especially preferred for practicing the invention are prepared by mixing together in a blending type mixer from 60 to 90 parts of calcined petroleum coke ground to pass a ⅛″ screen opening, 10 to 40 parts of coal tar pitch ground to pass a ⅛″ screen opening and from 0 to 2.5 parts of furfural. Typical mixes which can be used are shown in Tables I–III.

TABLE I

| | Parts by weight |
|---|---|
| Raw anthracite coke, ground through ⅛″ screen | 55 |
| Coal tar pitch, ground through ⅛″ screen | 30 |
| Carbon black, granulated | 15 |
| Furfural | 0–0.5 |

TABLE II

| | Parts by weight |
|---|---|
| Coarse calcined petroleum coke, ground through ⅛″ screen | 55 |
| Fine calcined petroleum coke, ground through 0.02″ screen | 24 |
| Coal tar pitch, ground through ⅛″ screen | 21 |
| Furfural | 0–0.5 |

TABLE III

| | Parts by weight |
|---|---|
| Bituminous coke, ground through ⅛″ screen | 40 |
| Graphite flour | 26 |
| Coal tar pitch, ground through ⅛″ screen | 26 |
| Carbon black, granulated | 8 |
| Furfural | 0–0.5 |

The raw materials mixture, upon passing through the extrusion machine, enters the die and increases in fluidity as its temperature increases. When the pyrolysis, or carbonization, temperature is reached, i.e., above about 300° C., and preferably in the range of 700° C. to 1200° C., pyroylsis takes place accompanied by the formation and discharge of gaseous products of combustion, occluded air, hydrogen and non-combustible volatile materials. These gases and volatile materials are emitted copiously from the discharge end of the die around the baked carbon body at a relatively steady rate. Under usual operating conditions, the emitted gases and volatiles contain combustible material which ignites and burns in the air as these pyrolysis byproducts discharge from the die. This burning of combustibles is not detrimental to the product, since the latter is already in a completely carbonized form. Due to the combination of the geometrically stable shape of the bake body established and maintained by the die, the extremely high pressure exerted on the body by the extrusion machine, and the high reaction temperature in the die, the carbonaceous material in the feed mixture is pyrolyzed quickly to carbon, forming a hard dense rigid product mass as it passes through the die. The product mass emerges continually from the die as a uniformly straight, compact baked body of continuous length. The density and other properties of the baked carbon product thus made compare favorably with those of baked carbon bodies produced by the batch and intermittent methods of the prior art.

In the baking step, substantially all carbonaceous materials in the ingredients are reduced to an elemental carbon form similar to that formed in the batch type baking processes known in the art. Therefore, it is to be understood that the carbon of the baked carbon product of my invention is in this substantially elemental carbon form.

A surprising feature of my invention and a feature which makes its practice possible is that when the die has been filled and brought to operating equilibrium during start-up operations, the high pressure exerted by the extrusion machine, which is preferably in excess of 2000 p.s.i., does not cause either the raw materials mixture or the baked carbon body to be ejected violently from the discharge end of the die. While I do not intend to be bound by any theory on which this fact is based, I believe that the mass in the die is not ejected violently because, in addition to its expansion due to heating in the die, it is undergoing a two-phase flow in the die, particularly during the early stages of the pyrolysis. This type of flow can be explained as follows: The plastic mixture entering the die consists of particulate solids suspended in a body of fluid binder. Inasmuch as the solids in the mass are relatively closely packed and tend to rub and wedge against one another, there exists in the die a combination of a flow of solid particles and a flow of fluid binder both moving simultaneously toward the outlet of the die. Such two-phase flow is usually characterized by a higher friction coefficient than is a single-phase flow. Further, it is believed that the suspended irregularly shaped particulate solids in the coke-pitch mixture of the type preferably used in practicing the invention, exhibit wedging effects not normally encountered in systems where smooth particles are predominantly present. In either event, it appears that the particles in the suspension spread outward in the die under pressure from the extruding machine and cause a high frictional drag on the die wall even though the mass as a whole is nominally fluid or plastic. Additionally, the binder exerts a high frictional drag due to its high viscosity and its adhesiveness to the hot die wall. As the result of the combination of the above effects, the baked carbon body moves at a controlled rate through the die despite the high pressure maintained on the mass by the extruder, and despite the fact that during pyrolysis the mass solidifies.

Another surprising feature of the invention is that neither pockets nor voids are formed in the mass of the body by the rapid expansion of the heated gases resulting from pyrolysis or other reaction of the mass in the die. Thus, as well as being extruded and baked smoothly at a readily controllable rate, the product body unexpectedly is dense, homogeneous and, on cooling, is ready for use as a baked carbon body.

An added advantage which arises from my invention and which is related to the discharge of production gases, lies in the fact that mixes prepared for use in extrusion equipment such as that which is used in practicing my invention do not need to be freed of occluded gases or air. For example, it is known in the dry solids handling art that dry mixtures invariably contain occluded air and that the air can cause voids and pockets in extruded product if it is not removed prior to extrusion. For this reason it is customary either to use a vacuum cycle in the operation of hydraulic or ram type presses, or to include a vacuum chamber in screw type extrusion machines when they are used. Such requirements cause slowing down of production, as well as add to the amount of equipment needed to carry out the operation. Inasmuch as my invention operates under a condition wherein a vent is inherently provided for the gases around the product in the die, the emission of air as well as large quantities of pyrolysis or reaction gases presents no problem. The presence of occluded air thus presents no problem in the practice of my invention. This characteristic of the invention eliminates the need for any deairing equipment or procedure in connection with preparation of the raw materials mixture for use in my invention.

In another embodiment of this invention, it is possible to control the density of the baked carbon and carbonized product while it is being made by increasing the back pressure in the die against which the extrusion machine pressure must operate. One method I prefer to use for this purpose is to apply the heat on the die at about three to nine inches from the end farthest from the extrusion machine. The discharge end of the die will then be considerably cooler than its hottest section. Thermal contraction then will result at the outlet end, causing the outlet end of the die to tightly grip the baked carbon body. Other means, e.g., cooling coils, also can be used to contract the outlet. Density, therefore, can be controlled by the position as well as the intensity of the heat on the die. Mechanical clamps or drags and the like can also be used to retard the forward movement of the baked carbon mass after it leaves the die, and thus increase back pressure in the die and extruder. A die with a tapered hole also can be used for the same purpose.

For the manufacture of graphite electrodes for use in electrolytic cells, a baking mixture composition such as that shown in Table II can be, and preferably is, used in practicing my invention. Inasmuch as baking, i.e., carbonization, takes place in a rigidly controlled geometric space, as disclosed above, a straight non-sagging form of baked carbon rod, stick or slab can be made and graphitized.

Graphitization is preferably carried out in an electric induction furnace. A suitable procedure is that taught in Derby, U.S. Patent 1,884,600. The procedure taught by Melton, U.S. Patent 2,090,693 is also useful. However, the practice of my invention is not limited to any particular graphitizing means or method.

For use as an electrode, the graphite product can be continuously impregnated with sealing materials, e.g., linseed oil, as it leaves the furnace and cools. On being cut to length, the cut end of the graphite can be further sealed, and the graphite body will be in a form ready for use in an electrolytic cell. For example, by practice of my invention, impregnated graphite electrodes can be directly and continuously made for use in an industrial cell where sodium chloride is electrolyzed to chlorine and caustic soda. The electrodes are made by cutting the cooled, sealed graphite to length and attaching a connector for making an electrical connection. The electrode is then clamped along with a large number of similar electrodes in a diaphragm type chlor-caustic cell such as a Gibbs cell containing a salt brine solution. On turning on the electrical current, the sodium chloride is electrolyzed to chlorine and caustic soda.

In yet another embodiment of my invention, a baked carbon-containing body is made according to the extrusion baking step of my invention by feeding to the extrusion machine and die a mixture comprising a binder, carbon (preferably petroleum coke) and a metal or nonmetal in elemental form or, preferably, in the form of an oxide, or salt, e.g., carbonate, of the metal or nonmetal. The carbonaceous material in the mixture is reduced to carbon in the same manner as is the baked carbon feed mixture described above, using a die surface temperature preferably at least 700° C. The carbonized product thus continually formed and extruded from the baking die can be used in the manufacture of carbide by continually feeding it, as it leaves the die, into a suitable furnace, e.g., an electric induction furnace, operated at a temperature suitable for forming a carbide, e.g., at a temperature above about 1500° C. and preferably above about 2200° C., depending on the carbide being made. My invention thus can be broadly used with any type of mixture on which carbonization can be practiced.

For carbonization of a mixture which is subsequently to be converted to carbide, the same type of binder as is used in preparation of baked carbon can be used. Coal tar pitch having a high melting point is preferred for this purpose. However, an inorganic binder, e.g., sodium silicate, also can be used. Also, any of the forms of carbon used to make baked carbon can be used as the carbon in the mixture. These include graphite flour, raw and calcined petroleum coke, and anthracite coke.

As is well known, a carbide is a compound consisting of a nonmetal or metal element chemically combined with elemental carbon, e.g., SiC. Therefore, the mixture which is to be reduced to a baked carbon-containing body preparatory to the carbiding step must contain at least a stoichiometric amount of at least one metal or nonmetal element in elemental or compound form. Examples of nonmetals which can be used in the practice of the invention include silicon and boron, preferably in their respective oxide forms, i.e., silica and boric oxide.

Examples of metals which can be used in the feed mixture in the practice of my invention are copper, iron, titanium, nickel and other metals having good conductance characteristics and high melting point. Alloys of these metals can also be used. The powdered form of each metal or alloy is preferred.

Examples of useful oxides are the copper oxides, iron oxides, titanium oxides, nickel oxides, tungsten oxides, uranium oxides, vanadium oxides, zirconium oxides, chromium oxides, manganese oxides and molybdenum oxides. Examples of salts are the carbonates of copper, iron, titanium, nickel, tungsten, uranium, vanadium, zirconium, chromium, manganese and molybdenum.

By practice of the carbide-forming step of my process, i.e., by passing the carbonized product from the die into the carbide-forming furnace, the carbides of silicon, boron, copper, iron, titanium, nickel, tungsten, uranium, vanadium, zirconium, chromium, manganese and molybdenum can each be continuously prepared in the form of a continuous extruded body.

By appropriate choice of known mixtures of ingredients for feeding to the extrusion-baking die, one can also use my process for the production of the commonly-known brush type carbons shown in Table IV.

TABLE IV

| Brush type graphite: | Apparent density |
|---|---|
| Carbon-graphite | 1.40–1.80 |
| Graphite carbon | 1.55–1.85 |
| Superbaked graphite | 1.48–1.70 |
| Resin bonded carbonized graphite | 1.60–1.90 |
| Electrographite | 1.43–1.72 |
| Metal-graphite bonded with carbonized resin or coal tar pitch | Over 1.60 |

My invention is further illustrated by the following examples:

Example 1

Thirty-nine lbs. of a mixture of coke particles is prepared from about 27 lbs. of calcined petroleum coke ground through a 1/8" screen, and about 12 lbs. of calcined petroleum coke ground through a 0.02 inch screen. The mixture is then placed in a sigma bladed dough mixer which is heated by a steam jacket with steam at about 14 p.s.i.g. Eleven pounds of coal tar pitch, ground through a 1/8" screen and having a softening point of about 190° F. and containing about 25 to 30% free carbon are added. The mass is mixed for one hour to form a "green mix." The "green mix" is charged to the feed box of a high pressure screw type extrusion machine which had been preheated by electric strip heaters for about two hours to bring it to an operating temperature of about 150° C. The extrusion machine has rigidly attached to it an extrusion baking die, made of Inconel, 24" long and having a 2" x 2" square die opening as disclosed above. The die is preheated to a surface temperature of about 850° C., using four No. K 552–SN Selas gas heaters in a furnace enclosure around the die. The die extends about two inches outside the enclosure. The hottest part of the heat is directed at an area about nine inches from the discharge end of the die. The extrusion machine speed is set to maintain an extrusion rate of about 1.75 inches per minute. A slug of previously carbonized product is used to hold back the initially formed product until carbonization of "green mix" reaches equilibrium in the die and back pressure of about 1800 p.s.i. builds up at the inlet end of the die. The slug is then allowed to be pushed out by the extending baked product, which continues to extrude as a continual supply of mixture is fed into the die. The baked carbon stick so produced is straight, continuous, completely baked out, without faults or voids. It has a 2" x 2" square cross-section. Its apparent density is 1.62.

Example 2

Coincident with the operation described in Example 1, the emerging baked carbon stick is first passed through an air jet to remove soot and then through the work coil of a 25 kw., 450 kc. induction heater (General Electric Co. Model No. 4HM 25 LI), having a 440 volt input. Movement is continuous and is provided by the extrusion machine described in Example 1. The stick is supported by a rigid guide before and by rollers after the heater. The portion of the stick within the coil attains a temperature in excess of about 2250° C. as measured by an optical pyrometer. Conversion of the carbon to graphite is substantially instantaneous. After passage through the work coil the stick is found to have been converted to graphite having an apparent density of about 1.65.

Example 3

A "green mix" is prepared as in Example 1. 39.5 pounds of a mixture of calcined petroleum coke having 60% coarse (ground through a 1/8 inch screen) and 40% fines (ground through a 0.02 inch screen) are used. To this mixture are added 10.5 pounds of coal tar pitch as described in Example 1 and 0.25 pound of furfural. This "green mix" is fed to the extrusion-baking die of Example 1 which is operated as in Example 1, except that the gas flame is applied about seven inches from the discharge end of the die. The baked stick product is passed directly into the induction heater of Example 2 where the carbon is converted to graphite. Graphite stick is produced continuously at a rate of about 1.5 inches per minute with more "green mix" being prepared as needed to maintain a constant supply to the die. The average apparent density of the product is about 1.43.

*Example 4*

A "green mix" is prepared using substantially the method described in Example 1. Sixty pounds of pulverized silica sand are mixed with 35 pounds of petroleum coke. To this mixture are added 0.25 pound of furfural and 10 pounds of petroleum pitch. This "green mix" is fed to the extrusion-baking die used in Example 1 as described in Example 1. A carbonized product in the form of a straight, continuous, completely baked out silica-carbon rod is continuously formed.

*Example 5*

Coincident with the operation as described in Example 4, the emerging carbonized rod is passed through an air jet to remove soot and is then passed through the work coil of the 25 kw., 450 kc. induction heater described in Example 2, maintained in an inert atmosphere. The temperature of the rod is maintained in excess of 2250° C. as measured by an optical pyrometer. After passage through the work coil and upon cooling, the carbonized rod is found to have been substantially converted to silicon carbide.

The process of the invention may be further explained with reference to the accompanying drawing, which illustrates diagrammatically the flow of materials in a preferred embodiment of the process.

In the drawing, calcined petroleum coke is ground in a mill 1 and the ground coke is transferred to a mixer 2. Ground coal tar pitch in an appropriate amount is added and the two ingredients are mixed intimately in the mixer. The mixture, in the form of green mix, is charged to the hopper 3 of an extrusion press 4 having a reduction gear and drive 5 attached thereto. In the press, the green mix is pressed into a dense homogeneous mass 14 and is extruded into the baking die 6. A furnace 7 surrounds the baking die and is supplied with natural gas fuel through burner jets 8. The die is maintained at a carbonizing temperature by the burning fuel. Fumes from the fuel and from the outlet of the die 6 are carried away through fume stack 9. The carbonized product emerges from the die 6 as a baked carbon rod 15. The rod is blown free of soot by air jets 10 and is guided by guide 11 into an induction coil 12 supplied by electricity from a source, not shown, through the wires 13, where it is graphitized. The rod leaves the induction coil 12 as a graphite product 16. It is conveyed by conveyor 19 to a cut-off device 18 where the graphite is cut into sections of appropriate size for use as an electrode 17.

Many different embodiments of this invention can be made without departing from the scope and spirit of the invention, as will be obvious to those skilled in the art, and it is to be understood that my invention includes all such embodiments and is not to be limited by the above description.

I claim:

1. A method for producing a continuous extruded carbonized body comprising (1) subjecting a particulate carbonizable mixture comprising carbonaceous material and binder therefor to a pressure of at least about 1200 p.s.i. while (2) continuously heating said mixture at a carbonizing temperature and simultaneously extruding said mixture at a rate controlled to pyrolyze the carbonaceous materials in the mixture into a continuous extruded carbonized body consisting substantially of elemental carbon before extruding is completed.

2. A method for producing a continuous extruded baked carbon body comprising (1) subjecting a particulate carbonizable mixture consisting essentially of carbonaceous material and binder therefor to a pressure of at least about 1200 p.s.i. while (2) continuously heating said mixture at a carbonizing temperature and simultaneously extruding said mixture at a rate controlled to pyrolyze the carbonaceous materials in the mixture into a continuous extruded baked carbon body consisting substantially of elemental carbon before extruding is completed.

3. A method for producing a continuous extruded graphite body comprising (1) subjecting a particulate graphitizable mixture consisting essentially of carbonaceous material and binder therefor to a pressure of at least about 1200 p.s.i. while (2) continuously heating said mixture at a carbonizing temperature and simultaneously extruding said mixture at a rate controlled to pyrolyze the carbonaceous materials in the mixture into a continuous extruded carbon body consisting substantially of elemental carbon before extruding is complete and (3) directly subjecting said body to a graphitizing temperature.

4. A method for producing a continuous extruded carbide body comprising (1) subjecting a particulate mixture comprising carbonaceous material, carbide-forming metal material and binder therefor to a pressure of at least about 1200 p.s.i. while (2) continuously heating said mixture at a carbonizing temperature and simultaneously extruding said mixture at a rate controlled to pyrolyze the carbonaceous materials in the mixture to elemental carbon in the form of a continuous extruded baked body before extruding is completed and (3) directly subjecting said body to a carbiding temperature for a period sufficient to convert the body to carbide.

5. The method according to claim 1 wherein the carbonizing temperature is in the range between 700° and 1200° C.

6. The method according to claim 2 wherein the mixture consists of from about 10 to 40 parts by weight of carbonaceous binder, 60 to 90 parts of ground coke, and 0 to 2.5 parts of furfural.

7. The method according to claim 3 wherein the mixture consists of from about 21 to 30 parts by weight of carbonaceous binder, 40 to 79 parts of coarse calcined coke, 0 to 60 parts of fine calcined coke and 0 to 2.5 parts of furfural.

8. The method according to claim 2 wherein the carbonizing temperature is in the range between 700° and 1200° C.

9. The method according to claim 3 wherein the carbonizing temperature is in the range between 700° and 1200° C.

10. The method according to claim 4 wherein the carbonizing temperature is in the range between 700° and 1200° C.

References Cited by the Examiner

UNITED STATES PATENTS

| | | | |
|---|---|---|---|
| 2,372,773 | 4/1945 | Fiechter | 264—29 XR |
| 2,526,876 | 10/1950 | Sejersted | 264—29 XR |
| 2,640,787 | 6/1953 | Greaves et al. | |
| 2,997,744 | 8/1961 | Stoddard et al. | 264—29 |
| 3,126,430 | 3/1964 | Price | 264—29 |

FOREIGN PATENTS

| | | |
|---|---|---|
| 656,694 | 1/1963 | Canada. |
| 517,798 | 2/1940 | Great Britain. |

ROBERT F. WHITE, *Primary Examiner.*

ALEXANDER H. BRODMERKEL, *Examiner.*

J. A. FINLAYSON, *Assistant Examiner.*